P. G. LEDEBOER.
COMBINATION DRIVING MECHANISM AND DIFFERENTIAL.
APPLICATION FILED MAR. 11, 1911.
1,030,097. Patented June 18, 1912.
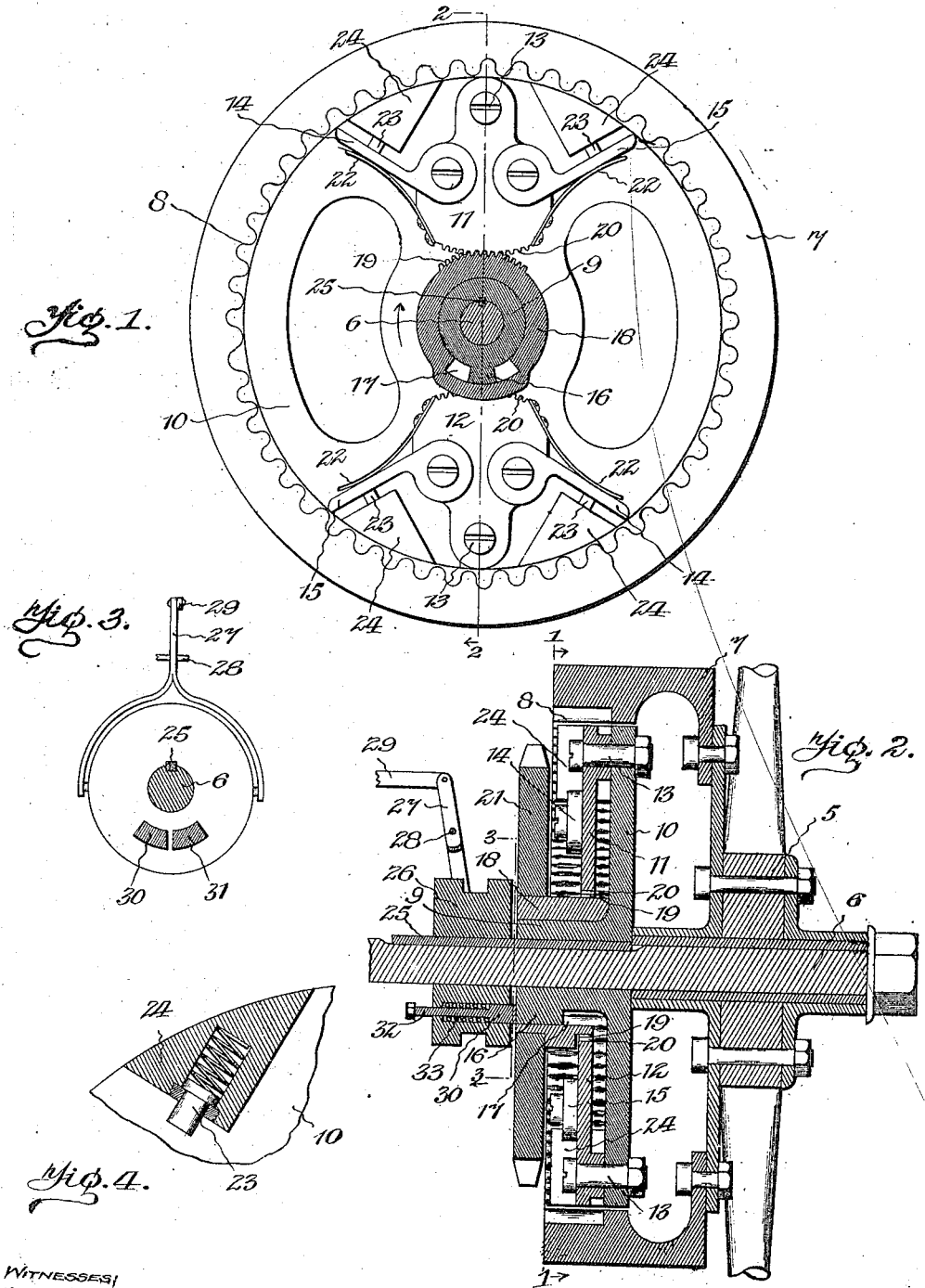
INVENTOR:
Peter G. Ledeboer,

UNITED STATES PATENT OFFICE.

PETER G. LEDEBOER, OF CHICAGO, ILLINOIS.

COMBINATION DRIVING MECHANISM AND DIFFERENTIAL.

1,030,097.   Specification of Letters Patent.   Patented June 18, 1912.

Application filed March 11, 1911. Serial No. 613,858.

*To all whom it may concern:*

Be it known that I, PETER G. LEDEBOER, a citizen of the United States, residing at Chicago, in the county of Cook and State of Illinois, have invented certain new and useful Improvements in Combination Driving Mechanism and Differentials, of which the following is a specification.

My present invention relates to a clutch mechanism for driving the rear wheels of an automobile or other vehicle, and my primary object is to provide one which will obviate the necessity of the usual two-part rear axle and its differential mechanism.

A further object is to accomplish the above result by applying the power directly against levers instead of through the usual pawl systems, the latter having been found to be inefficient and liable to frequent breakage.

A further object of my invention is to provide means whereby the parts, after engagement to drive the wheels in one direction, may be locked together and prevented from reversal.

With these and other objects in view, my invention resides in the features of construction, arrangement and operation to be hereinafter described with reference to the accompanying drawing, forming a part of this specification, and in which—

Figure 1 is a view partly in elevation and partly in section, taken on line 1—1 of Fig. 2. Fig. 2 is a central vertical section taken on the line 2—2 of Fig. 1. Fig. 3 is a detail section taken on line 3—3 of Fig. 2, and Fig. 4 is a detail section through one of the butt stops, showing its spring plunger, and on an enlarged scale.

Referring now to these figures, 5 represents the hub portion of a wheel, mounted to rotate upon one end of the shaft or axle 6. To the inner side of the hub 5 is secured a circular frame 7, surrounding shaft or axle 6, and embodying an internally toothed ring 8.

Mounted upon the shaft 6, within frame 7, is a support which comprises a hub portion 9 and a disk 10, adjacent to the edge of the latter of which are pivotally mounted lever carrying members 11 and 12, these members being connected to said disk at their outer ends, by pivot bolts 13 so that their inner ends may swing in opposite directions. Pivotally mounted, at their inner ends, upon the lever carrying members 11 and 12, are levers 14 and 15, which outstand in opposite directions and are adapted for engagement with the toothed ring 8 when the members 11 and 12 are moved to either side of their central position; the action of these levers 14 and 15 in engaging the ring 8, being similar to that of a pawl. From this it will be readily seen that as the wheel and the frame 7 are idle, they may at any time travel at a greater speed than that of the driving means to be hereinafter described, thus providing for the travel of the outer wheel at a greater rate of speed than the inner wheel in turning a corner.

The hub portion 9 of the support before described, is provided with a segmental projection 16, adapted for engagement within an enlarged segmental recess 17 in a member 18 sleeved upon said hub portion 9, this member 18 having teeth 19 in engagement with teeth 20 upon the inner curved ends of the lever carrying members 11 and 12. This sleeve 18 also carries a sprocket wheel or other member 21 to which power is applied from the motor of the vehicle, either direct or through a counter-shaft. Thus when power is transmitted to the sleeve 18 to rotate the same in a direction shown by the arrow in Fig. 1, it will cause rocking movement of the lever carrying members 11 and 12 to engage the levers 15 with the toothed ring 8, before the end of the recess 17 of said sleeve strikes the hub projection 16 of the supporting disk 10. The levers 14 and 15 are yieldably guided into engagement with the toothed ring 8 by springs 22, pressing the same in one direction and spring plungers 23 pressing the same in the opposite direction, said spring plungers 23 being mounted, as particularly shown in Fig. 4, within butt stops 24, formed integral with disk 10, and located upon the inner sides of the levers 14 and 15, so that when the levers are engaged as before described and disk 10 caused to rotate, the levers 15 form a bearing between the disk 10 and the frame 7, against which the corresponding butt stops 24 engage, thus forcing rotation of the frame 7 and of the wheel.

The hub 9 of the supporting disk 10 is secured to the shaft 6 by means of a key 25, which also serves to spline a collar 26 upon the shaft 6. This collar 26 has a circular groove and is movable toward and away from the hub 9 by means of a yoke 27, pivoted at 28, and adapted to be actuated by a suitable lever 29. Mounted through the collar 26 upon opposite sides of a line drawn diametrically therethrough, is a pair of segmental plugs 30 and 31, each of these plugs having a stem 32 and being controlled by a spring 33 tending to press the same outwardly toward the hub 9 and against its projection 16. Ordinarily the collar 26 remains in an inoperative position away from the hub 9, but should the machine be traveling down a steep incline and the operator desires to prevent any possibility of a reversal of the levers 14 and 15, collar 26 is moved to the position shown in Fig. 2, and as soon as the sleeve 18 starts to move as before described, the approach of one end of its recess 17 toward the hub projection 16, enlarges the space upon the opposite side of the said projection, into which the corresponding one of the plugs 30 and 31 is immediately projected by means of a spring 33, thus locking the hub 9 and sleeve 18 against relative movement necessary to reverse the levers 14 and 15 as before described. Thus it will be seen that I accomplish the objects first stated, by simple and efficient means which will be strong and lasting in use.

I claim:

1. The combination with a wheel and its shaft, of a frame secured to the wheel and having a toothed ring, levers movable to engage the toothed ring, a support upon which said levers are mounted, a driven member having connection with said levers, connections between said driven member and said support to drive the latter and permit relative movement thereof, and means to lock said driven member and said support against relative movement, said means being movable to and from an operative position.

2. The combination of a member to be driven, and its shaft, said member including a toothed ring, pawls engageable with the toothed ring, a pivoted member carrying the pawls, a support for the pivoted member, a driving member operatively connected to the pivoted member to swing the same and effect engagement of the pawls with the toothed ring, and stops on the support adjacent to the teeth of the ring, said stops being engageable with the pawls when the latter engage the teeth of the ring.

3. The combination of a member to be driven, and its shaft, said member including a toothed ring, pawls engageable with the toothed ring, a pivoted member carrying the pawls, a support for the pivoted member, a driving member operatively connected to the pivoted member to swing the same and effect engagement of the pawls with the toothed ring, stops on the support adjacent to the teeth of the ring, said stops being engageable with the pawls when the latter engage the teeth of the ring, and spring plungers carried by said stops and projecting therefrom into engagement with the pawls.

4. The combination of a member to be driven, and its shaft, said member including a toothed ring, pawls engageable with the toothed ring, a pivoted member carrying the pawls, a support for the pivoted member, a driving member operatively connected to the pivoted member to swing the same and effect engagement of the pawls with the toothed ring, and a lock to prevent reverse motion of the driving member after the pawls have engaged the toothed ring.

5. The combination of a member to be driven, and its shaft, said member including a toothed ring, pawls engageable with the toothed ring, a pivoted member carrying the pawls, a support for the pivoted member, a driving member operatively connected to the pivoted member to swing the same and effect engagement of the pawls with the toothed ring, and a lock to prevent reverse motion of the driving member after the pawls have engaged the toothed ring, said lock being adjustable into inoperative position.

6. The combination of a member to be driven, and its shaft, said member including a toothed ring, pawls engageable with the toothed ring, a pivoted member to which the pawls are pivoted, a support for the pivoted member, said support having a hub, a sleeve loosely mounted on the hub, a driving member mounted on the sleeve, and a gearing between the sleeve and the aforesaid pivoted member carrying the pawls.

7. The combination of a member to be driven, and its shaft, said member including a toothed ring, pawls engageable with the toothed ring, a pivoted member carrying the pawls, a support for the pivoted member, said support having a hub provided with a lug, a driving member operatively connected to the pivoted member carrying the pawls, said driving member having a recess to receive the aforesaid lug, the latter fitting loosely in the recess, and a locking device adapted to be inserted into the recess behind the lug to prevent reversal of the driving member.

In testimony whereof I affix my signature in presence of two witnesses.

PETER G. LEDEBOER.

Witnesses:
MYRON G. CLEAR,
ANNA M. MENGEL.